(12) United States Patent
 Mulder

(10) Patent No.: US 8,637,100 B2
(45) Date of Patent: Jan. 28, 2014

(54) METHOD OF PRODUCING A BRIGHT, YEAST FERMENTED BEVERAGE

(75) Inventor: Hendrikus Mulder, Uitgeest (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 713 days.

(21) Appl. No.: 12/300,773

(22) PCT Filed: May 14, 2007

(86) PCT No.: PCT/NL2007/050215
§ 371 (c)(1),
(2), (4) Date: Apr. 13, 2009

(87) PCT Pub. No.: WO2007/136254
PCT Pub. Date: Nov. 29, 2007

(65) Prior Publication Data
US 2009/0324775 A1 Dec. 31, 2009

(30) Foreign Application Priority Data

May 19, 2006 (EP) .................................... 06114242
May 19, 2006 (EP) .................................... 06114264

(51) Int. Cl.
*C12C 11/00* (2006.01)
*C12G 1/00* (2006.01)

(52) U.S. Cl.
USPC ............................................. 426/16; 426/12

(58) Field of Classification Search
USPC ............................................... 426/11, 15, 16
See application file for complete search history.

(56) References Cited

U.S. PATENT DOCUMENTS 3,234,026 A * 2/1966 Coutts .............................. 426/16
3,407,069 A * 10/1968 Hall et al. ........................ 426/16
3,772,036 A * 11/1973 Stiles .............................. 426/417
5,762,991 A * 6/1998 Dziondziak et al. ............ 426/11

FOREIGN PATENT DOCUMENTS

DE 42 44 494 C1 3/1994
DE 4244595 C1 * 3/1994
(Continued)

OTHER PUBLICATIONS

International Search Report for PCT/NL2007/050215, dated Jul. 27, 2007, 2 pages.

*Primary Examiner* — Humera Sheikh
*Assistant Examiner* — Subbalakshmi Prakash
(74) *Attorney, Agent, or Firm* — Gilberto M. Villacorta; Sunit Talapatra; Foley & Lardner LLP

(57) ABSTRACT

The invention relates to a method of producing a bright, yeast fermented beverage, said method comprising the continuous production of wort from mash. More particularly, the present method comprises: a. mashing in a particulate, starch-containing raw material with water and enzymatically hydrolysing the starch to fermentable sugars; b. continuously producing a fermentable wort from the heated mash; c. introducing the wort into a fermenter to ferment the wort with the help of biologically active yeast; d. removing yeast from the fermentate by means of sedimentation; and e. clarifying the low-yeast fermentate to produce a bright, yeast fermented beverage by: processing the low-yeast fermentate in one or more separators to remove suspended material, said one or more separators being selected from the group consisting of centrifuges and decanter centrifuges; and filtering the processed fermentate. The efficiency with which the low-yeast fermentate is clarified to a bright beverage can be maintained during a very long period of time (e.g. for several weeks), which is particularly beneficial in case of a continuous brewing operation in which both wort production and yeast fermentation are carried out in a continuous fashion.

21 Claims, No Drawings

(56) References Cited

FOREIGN PATENT DOCUMENTS

| GB | 1 243 368 | A |   | 8/1971 |
|----|-----------|---|---|--------|
| GB | 1243368 | A | * | 8/1971 |
| SU | 1283250 | A | * | 1/1987 |
| WO | WO 9212231 | A1 | * | 7/1992 |
| WO | WO-94/16054 | A1 |   | 7/1994 |
| WO | WO 95/26395 | A |   | 10/1995 |
| WO | WO 9526395 | A1 | * | 10/1995 |

\* cited by examiner

US 8,637,100 B2

METHOD OF PRODUCING A BRIGHT, YEAST FERMENTED BEVERAGE

TECHNICAL FIELD OF THE INVENTION

The present invention relates to a method of producing a bright, yeast fermented beverage, said method comprising the continuous production of wort from mash. In the present method, the continuously produced wort is fermented with the help of biologically active yeast, after which the yeast is removed and the resulting beverage is clarified.

The present method offers the advantage that a truly bright, i.e. clear, beverage can be produced at constant high efficiency during a prolonged period of time.

BACKGROUND OF THE INVENTION

Traditionally, brewing beer begins with malted barley that is milled and mixed with hot water to form a mash. During mashing, the malt starches are converted to sugars. Next, the wort that is obtained after separating the spent grain from the mash is brought to a boil. During this stage, hops are added at different times during the boil. The wort is then cooled and aerated, and brewers' yeast is added for fermentation. After fermentation the "green beer" undergoes maturation and cold storage. Usually, the last step in the brewing process is filtration, and then carbonation. Next the beer is moved to a holding tank where it stays until it is packaged in for example bottles, cans or kegs.

It has been recognised in the beer brewing industry that the production of wort in a continuous operation offers a number of advantages, including:

- higher productivity and lower investment: vessels can be operated for prolonged periods of time under full load, meaning that for equal production volume smaller vessels are needed than in a batch process;
- constant and better quality: process is easier to control due to possibility of adapting process parameters to local and instantaneous requirements and because steady-state-conditions are much more stable;
- high hygienic standard: continuous process is operated in a closed system;
- less energy: energy consumption is evenly spread, without major use peaks;
- less labour: operation of continuous process requires less attention;
- the possibility to recycle heat and or materials instantaneously without the use of buffers;
- less standstill and cleaning: continuous process can be operated at much longer runlengths than batch processes.

Many efforts have been made since the end of the 19$^{th}$ century to realise one or more of the above advantages through the development of continuous brewing processes. However, todate across the globe not more than just a couple of breweries have actually introduced continuous brewing operations such as continuous wort production and/or continuous fermentation into their factories.

Beer is normally filtered at a late stage in the production to clarify it and to remove particles that have been carried over from earlier production stages. The filtration process usually entails either pressure filtration or the use of a filter press. In either of these two methods of beer recovery, a filter aid, such as kieselguhr, is normally used. It is also possible to clarify without the use of a filter aid, e.g. by using cross-flow membrane filtration.

Also in brewing processes that utilise continuous wort production in combination with suspended yeast fermentation, in order to produce a bright beer, solids have to be removed after yeast fermentation.

WO 94/16054 describes a continuous process for producing beer in which wort is produced and fermented in a continuous fashion. This international patent application mentions the use of a centrifuge to obtain a solids free liquid medium that is further processed to reduce the alcohol content.

DE-C 42 44 595 describes a process for continuous production of beer comprising:

a. preparing a mash and heating said mash to 75-85° C. for 30-90 minutes;
b. removing spent grain from the mash in a decanter and subsequently washing with brewing water in a two-step decanter;
c. adding hop or hop extract to the hot wort and heating the wort to a temperature of 105-140° C. for 2-60 minutes at a pressure of 1.2-3.6 bar.
d. subjecting the pressurised wort to a flash evaporation; continuously removing trub in a separator and cooling the wort to fermentation temperature in a heat exchanger;
e. continuously transferring the cooled wort having an oxygen content of 0.5-3.0 mg $O_2$/l to fermenter in the form of a loop reactor in which the wort is continuously recirculated and which comprises a biocatalyst in which biologically active yeast has been immobilised; and
f. continuously removing liquid medium from the fermenter during fermentation; centrifuging the removed liquid to remove free yeast cells contained therein; heating the yeast-free liquid medium to 60-90° C. for 0.5-30 minutes; cooling down; recirculating a part of the cooled stream to the fermenter and a part to final filtration of the beer.

It is observed in the German patent application that a significant improvement in the final filtration is achieved as a result of centrifuging off the free yeast in a centrifuge.

SUMMARY OF THE INVENTION

The inventors have developed a method for the production of a bright, yeast fermented beverage, comprising the successive steps of continuously producing wort from mash; removing trub from the wort by means of centrifugation; fermenting the wort with the help of biologically active yeast; and removing yeast by means of sedimentation, wherein the resulting beer is clarified by first processing the low-yeast fermentate in one or more separators to remove suspended material and subsequently filtering the processed fermentate. Separators that can suitably be employed in the present method include centrifuges, decanters and sedicanters.

It was found unexpectedly that non-dissolved components can be removed very efficiently by employing a sequence of separation devices at different stages of the present method, i.e. spent grain separation, trub removal (centrifuge), yeast removal (sedimentor), pre-clarification (separator) and clarification (filtration unit). More particularly, it was found that the efficiency with which the low-yeast fermentate is clarified to a bright beverage can be maintained during a very long period of time (e.g. for several weeks), which is particularly beneficial in case of a continuous brewing operation in which both wort production and yeast fermentation are carried out in a continuous fashion.

It is noted that unlike the process described in German patent DE-C 42 44 595, the present method does not employ a separator to remove yeast cells. In the present method the yeast cell are first removed by sedimentation, following which a separator is employed to remove other non-dissolved components.

Although the inventors do not wish to be bound by theory, it is believed that after continuous wort production a variety of undissolved components remain in the wort, despite the trub removal step. These undissolved components are at best partly digested during yeast fermentation and/or removed in the yeast sedimentor. Also during maturation and/or cold storage these undissolved component cannot be removed effectively. Neither separators or filters alone are capable of efficiently removing the undissolved components that are present in the low-yeast fermentate. Whereas initially the filters may be capable of removing the undissolved components, it was observed that filtering efficiency decreases rapidly over time. By employing the present combination of separation equipment, i.e. centrifuge, sedimentor, separator and filter, high separation efficiency can be maintained for a long time. Thus, the present invention enables efficient clarification of yeast fermented beverages that have been made from wort that was produced in a continuous fashion.

DETAILED DESCRIPTION OF THE INVENTION

Accordingly, one aspect of the invention relates to a method of producing a bright, yeast fermented beverage, said method comprising:
a. mashing in a particulate, starch-containing and optionally malted raw material with water, heating the resulting mash and enzymatically hydrolysing the starch to fermentable sugars;
b. continuously producing a fermentable wort from the heated mash by executing the following steps in a continuous fashion:
  removing spent grain from the heated mash to produce a mash extract;
  converting mash extract into wort by heating said mash extract to a temperature of 60-140° C. for 5-120 minutes, preferably to a temperature of 75-125° C. for 30-120 minutes;
  removing organic volatiles from the hot wort by reducing pressure and/or by stripping it with a gas or steam;
  removing trub from the wort by means of centrifugation; and
c. introducing the wort into a fermenter to ferment the wort with the help of biologically active yeast;
d. removing yeast from the fermentate by means of sedimentation; and
e. clarifying the low-yeast fermentate to produce a bright, yeast fermented beverage by:
  processing the low-yeast fermentate in one or more separators to remove suspended material, said one or more separators being selected from the group consisting of centrifuges and decanter centrifuges; and
  filtering the processed fermentate.

The term "mashing in" as used herein refers to the admixing of starch-containing raw material, water and enzymes capable of hydrolysing starch. The latter enzymes may be provided by e.g. malt or by another enzyme source, e.g. a commercially available enzyme preparation containing starch degrading enzymes such as those found in malt, notably α-amylase, β-amylase and/or glucoamylase. Preferably, the enzymes are employed in the present method in the form of malt.

The present process is particularly suitable for producing bright, yeast-fermented malt beverages such as beer, ale, malt liquor, porter and shandy. Preferably, the present process is employed to produce an alcoholic or non-alcoholic bright beer. In the present process hop may suitably be added, e.g. to the mash extract prior to the removal of organic volatiles.

Filtration

In the present method, yeast, protein, and carbohydrate particles need be removed from the fermented wort to achieve the necessary clarity. The present invention offers the advantage that the low-yeast fermentate can be filtered at a very high throughput for a prolonged period of time. Typically, a throughput of more than 4 hl/hr/m$^2$ can be realised and maintained with a pressure increase of less than 0.3 bar/hr, preferably of less than 0.2 bar/hr.

According to a preferred embodiment, the clarification of the low-yeast fermentate involves cake filtration, depth filtration and/or cross-flow membrane filtration. More preferably, said clarification involves cake filtration and/or cross-flow membrane filtration. Since clarification with cross-flow membrane filtration yields particularly good results, the use of cross-flow membrane filtration is most preferred.

In cake filtration, solids form on a filter cake on the surface of a filter medium using either cartridges or granular media such as kieselguhr. Cartridges are usually disposable, with media of various kinds of fibres or porous structures, and generally mounted in pressure enclosures. In depth filtration, also called bed filtration, gravity flow as well as pressure operation are used. Cross-flow filtration is a separation technique that classifies on the basis of size.

Cake filtration offers the advantage that long filtration cycles at high flow rates can be realised. According to a particularly preferred embodiment, cake filtration is done in conjunction with a filter aid, e.g. kieselguhr. The filter aid is suitably injected at the point where the stream of processed fermentate, together with the suspended solids, forms an incompressible mass referred to as the "filter-cake." The resulting porous bed creates a surface that traps suspended solids, removing them from the processed fermentate. Filter aid is preferably continuously added into the flow of processed fermentate to maintain the permeability of the cake. Not all of the particles will be trapped at the surface; some, especially the finer material, will pass into the filter cake and be trapped—a process referred to as "depth filtration." Depth filtration is not as effective as surface filtration, but is still a significant mechanism of filtration by filter aids.

There are several types of powder filters that may be used in the present, such as the plate and frame, the horizontal leaf, the vertical leaf, and the candle filter. Plate and frame filters consist of a series of chambers enclosed within a metal frame. Between adjacent frames is a double-sided porous filter plate covered by either a fine mesh or a sheet. The filter sheet acts as a trap for the filter aid, which otherwise might bleed through, thereby assuring excellent clarity. Filter sheets are generally made with cellulose fibre, diatomaceous earth, perlite, and a resin for bonding to give dry and wet strength. Some are available only with filtration fibres. The average pore size of filter sheets is typically between 4 and 20 microns. Each plate alternates with a frame with the entire system held together by e.g. a screw or hydraulic clamp mechanism. This type of filter is very similar in appearance to the sheet filter, except it has sludge frames.

Pre-Clarification Using One or More Separators

The separators that are employed to process the low-yeast fermentate prior to filtration are selected from the group consisting of centrifuges and decanters centrifuges. Most preferably, the low-yeast fermentate is processed in one or more centrifuges prior to filtration. Centrifugational pre-clarification is advantageously conducted at a theoretical capacity factor (SIGMA value) of at least 1,000 m$^2$, preferably of at least 2,500 m², more preferably of at least 5,000 m², most preferably of at least 10,000 m², at a flow rate of 1 m³/hr. The theoretical capacity factor of a separator is calculated on the basis of the method described in "Solid-Liquid Separation", 2$^{nd}$ edition, 1981, by Ladislav Svarovsky, Butterworth-Heineman. The factor is calculated according to the following relation between: the number of discs (n), the gravitational acceleration (g), the angular speed (ω), the angle of the discs with the vertical feed pipe (α), the inner radius of the discs package ($r_1$) and the outer radius of the discs package ($r_2$).

$$\sum = \frac{\varpi^2}{g} \frac{2}{3} \pi n (r_2^3 - r_1^3) \cot \alpha$$

Typically, the amount of suspended material that is removed by the aforementioned separators is in the range of 0.1-2 g/l. The turbidity of the wort obtained from the last separator before filtering typically does not exceed 100 EBC. Preferably, said turbidity does not exceed 50 EBC, most preferably it does not exceed 20 EBC.

Cold Storage

Cold storage typically involves maintaining the fermentate at a temperature of less than 10° C., preferably of less than 5° C., more preferably of less than 2° C. for at least 12 hours, preferably for at least 24 hours. According to a preferred embodiments cold storage is applied after maturation and before filtration, more preferably before processing in the one or more separators. During cold storage undissolved components may precipitate and are advantageously removed from the low-yeast fermentate before it is subjected to filtration, preferably before it is processed in the one or more separators.

Maturation

Typically, the present method employs a maturation step following fermentation. After fermentation, many undesirable flavours and aromas are present in the "green" or immature beer. Maturation (also sometimes referred to as ripening) reduces the levels of these undesirable compounds to produce a more palatable product. Preferably, the maturation step occurs in the present process prior to filtration, more preferably, prior to processing in the one or more separators.

Advantageously, maturation and yeast separation are achieved simultaneously in the present method in a continuous fashion by introducing the fermented wort containing at least 10 g/l of biologically active yeast into a sedimentation vessel and separately removing the supernatant (i.e. low yeast fermentate) and yeast sediment from the vessel; wherein the residence time of the fermented wort in the vessel exceeds 12 hours, preferably exceeds 24 hours. According to a particularly preferred embodiment, the fermented wort passes through the sedimentation vessel in a vertically downwards laminar flow. By combining yeast separation and maturation in one step important efficiency gains may be realised.

In a further preferred embodiment, between 10 and 100% of the yeast sediment that is removed from the sedimentation vessel is recirculated to the wort fermentation. This particular embodiment of the invention offers the advantage that it enables wort fermentation to be conducted at high yeast concentrations. The aforementioned advantages in relation to continuous maturation and yeast separation can be realised without affecting the efficiency of the present method, notably the clarification step, thanks to the processing of the low yeast fermentate in one or more separators prior to filtration.

Maturation may also be achieved in a batch process by maturing the immature beer in a maturation vessel or in a fermenter. Following maturation, yeast is preferably removed. Next, the beer may be transferred to cold storage tanks for stabilisation or it may be cooled in the fermenter or maturation vessel.

Yeast Separation

In the present method, yeast is separated from the fermentate by means of sedimentation. Here the term "sedimentation" refers to any separation method that utilises gravity to separate suspended material from a liquid.

According to a particularly preferred embodiment, yeast separation is achieved by transferring the fermentate from the fermenter to a sedimentor in which the yeast is removed from the fermentate by means of sedimentation.

The sedimentor typically contains an outlet for the separated yeast that is positioned near the bottom the sedimentor as well as an outlet for the low-yeast fermentate that is just below the liquid surface. The sedimentor is advantageously operated in a continuous fashion in which the amount of fermentate that enters the sedimentor equals the combined amounts of yeast residue and low-yeast fermentate that are extracted from the sedimentor. The yeast content of the low-yeast fermentate typically does not exceed 50 g/l. Preferably, the yeast content of the low-yeast fermentate is within the range of 1-20 g/l, more preferably within the range of 2-10 g/l. Whenever reference is made to "yeast content", unless specifically indicated otherwise, what is meant is the concentration of wet yeast. The amount of wet yeast contained in a suspension equals the amount of yeast cake with a water content of 73% that may be isolated from the suspension by means of centrifugation. The aforementioned water content includes the water contained in the yeast cells.

Typically, at least 20 wt. %, especially at least 40 wt. % of the yeast is removed from the fermentate by means of sedimentation. Preferably at least 60 wt. %, more preferably at least 80 wt. %, even more preferably at least 90 wt. % and most preferably at least 95 wt. % of the yeast present in the fermentate is removed by sedimentation.

Fermentation

According to a particularly preferred embodiment of the present invention, the biologically active yeast employed in steps c. and d. is immobilised by self-aggregation. The use of yeast immobilised by self-aggregation offers a number of advantages such as high cell density and increased productivity. The self-aggregated yeast cells can be removed quite effectively by means sedimentation.

Advantageously, at least some of the removed yeast is recirculated to the fermentation.

The benefits of the present method are particularly pronounced in case the wort is fermented continuously and yeast is removed from the fermentate continuously. In a preferred embodiment of the present method, the wort is fermented in a continuous fashion by:

feeding the wort into a propagation vessel in which it is combined with a recirculated stream of fermented yeast-containing wort and in which oxygen is supplied to initiate yeast growth; and transferring the wort from the propagation vessel into a sequence of one or more fermentation vessels in which the yeast is kept suspended by means of stirring, recirculation and/or carbon dioxide evolution;

feeding the fermented wort into one or more sedimentors to remove a yeast-containing residue;

recirculating at least a part of the yeast-containing residue to the propagation vessel and/or the one or more fermentation vessels and converting the remainder of the fermented wort into the bright, yeast fermented beverage.

Trub Removal

Another separation step employed in the present process is the removal of trub from the wort. Technically, trub is defined as the insoluble precipitate that results from protein coagulation and simpler nitrogenous constituents that interact with carbohydrates and polyphenols. It is also referred to as "break". Hot trub is that part of the break that occurs during the boil and is mostly proteinaceous; cold trub, which consists of proteins and protein-tannin complexes, is formed as the wort cools and the beer settles. Although most amino acids are assimilated by the yeast, remaining proteins should be removed because they later react with polyphenols, resulting in colloidal instability (haze). The elimination of all proteins is not warranted or even desirable, however, because they are essential for giving the beer full body and head retention.

Hot trub precipitates are formed during the boiling of the wort. In a study in a German brewery, hot trub particles varied in size from 30 to 80 microns. Effective removal of hot trub before fermentation is critical because the trub can smear the yeast's cell walls, impeding the transport of substances in and out of the cell, which can lead to head retention problems, poor flavour stability, and harsh bitterness in the palate of the beer. The overall amount of trub (wet weight) usually varies from 2-10 g/l, depending on various factors.

In the present process, trub is removed from the wort by means of centrifugation, e.g. in a centrifuge or a decanter centrifuge. Most preferably, the trub is removed in a centrifuge. The centrifuge is typically operated at a centrifugal force of at least a theoretical capacity factor ($\Sigma$) of at least 1,000 m$^2$, preferably of at least 2,500 m$^2$, more preferably of at least 5,000 m$^2$ and even more preferably of at least 10,000 m$^2$ at a flow rate of 1 m$^3$/hr. The theoretical capacity factor usually does not exceed 400,000 m$^2$ at a flow rate of 1 m$^3$/hr. Preferably at said flow rate it does not exceed 200,000 m$^2$, most preferably it does not exceed 100,000 m$^2$.

It was unexpectedly found that in the present continuous method trub removal is achieved most efficiently if the hot wort is cooled to a temperature below 80° C. prior to trub removal. According to a particularly preferred embodiment, trub is removed from wort that has been cooled to a temperature of less than 75° C., more preferably of less than 70° C., most preferably of less than 65° C. Usually, trub removal is achieved at a temperature of at least 40° C., preferably of at least 50° C.

The hot wort may suitably be cooled, preferably after trub removal, to a temperature as low as 8° C., in which case no further cooling of the wort is required prior to introduction of the wort in the fermenter. The hot wort obtained after removal of the organic volatiles is suitable cooled by passing said hot wort through a cooling device, e.g. a plate heat exchanger, tubular heat exchangers, self cleaning heat exchangers (e.g. scraped surface heat exchangers and fluidised bed self cleaning heat exchangers).

In order to ensure that the trub is removed efficiently by centrifugation it is important that spent grain and other suspended material has been largely removed prior to centrifugation, especially prior to the removal of the organic volatiles. Thus, only a small fraction of trub needs to be removed by centrifugation. Typically the amount of trub removed by centrifugation is less than 3 g/l of the feed. Preferably, the amount of trub removed is within the range of 1-2 g/l of the feed. The amount of suspended material after trub removal normally does not exceed 150 mg/l.

The wort obtained after trub removal contains very little suspended material. Nonetheless, it was established by the inventors that in particular suspended and dissolved components that are already present in the wort after trub removal and prior to fermentation can have a pronounced detrimental effect on clarification efficiency over time.

Spent Grain Separation

The present method employs a sequence of separation steps, beginning with the removal of spent grain from the heated mash. The spent grain may suitably be removed by means of one or more separators selected from the group consisting of centrifuges and decanters. Most preferably, the spent grain is removed by means of one or more decanters. The use of decanters for removing spent grain offers the advantage that it is a continuous and robust technology that delivers dry spent grains (typically 25-40% dry matter) and a clarified wort independent from malt quality. Here the term "decanter" is used to refer to a scroll type continuous discharge centrifuge. Most preferably, the decanter employed for removing spent grain is a decanter centrifuge.

Mashing

According to a particularly preferred embodiment, the present method comprises the step of continuously producing a mash extract by means of decoction mashing employing substantial amounts of starch-containing adjuncts such as rice, maize, sorghum and/or rye. The continuous decoction mashing according to this embodiment comprises the following steps:

a. mixing a first malt enzyme source with an aqueous liquid to obtain an aqueous malt enzyme suspension;
b. separately, mixing a second enzyme source with one or more starch-containing adjuncts to obtain a decoction suspension;
c. subjecting the decoction suspension to a first heat treatment whilst maintaining temperature conditions that do not cause significant gelatinisation of the starch;
d. subjecting the decoction suspension to a second heat treatment to simultaneously partially gelatinise and enzymatically degrade the starch;
e. combining the heated decoction suspension obtained from the second heat treatment with the aqueous malt enzyme suspension from step a. to obtain a mash;
f. maintaining the mash at 35-85° C. for at least minutes; and
g. removing spent grain from the heated mash to produce a mash extract.

In this method the decoction suspension containing the one or more adjuncts is subjected to a carefully controlled multi-step heat treatment. During this multi-step heat treatment, the starch-containing adjuncts are gelatinised at elevated temperatures, following which they can be hydrolysed effectively by the amylases contained in the aqueous malt enzyme suspension with which the heated decoction suspension is (re) combined. During the relatively mild first heat treatment conditions are chosen such that the rate of starch gelatinisation is in pace with the rate of starch hydrolysis, meaning that the viscosity of the decoction suspension is maintained at sufficiently low level to keep the suspension pumpable. During the much more severe second heat treatment, the starch is gelatinised rapidly, making it much more susceptible to enzymatic hydrolysis, which is initiated when the decoction is recombined with the aqueous malt enzyme suspension. The present method is very robust and easy to control. Furthermore, the method yields a mash extract of constant quality. Furthermore, the present decoction method was found to contribute to the overall efficacy of the present method or producing a bright, yeast fermented beverage. In particular, the present method ensures essentially complete gelatinisation of the starch contained in the adjunct and thus effectively prevents fouling of the clarification filters/membranes by starch.

The term 'adjunct' as used herein encompasses any cereal grain or fermentable ingredient that can be added to the mash as a source of starch. The adjunct may be malted or unmalted, the latter being preferred. The adjuncts may optionally be pre-processed by e.g. torrification, flaking, cooking, micronisation, roasting. Rice, maize, sorghum, rye, oats, wheat, corn, tapioca flour, potato, malt, barley and combinations thereof can be used for this purpose. Preferably, the adjunct is derived from a cereal selected from the group consisting of rice, maize, sorghum, rye and combinations thereof. Typically, the adjunct employed in the present method contains at least 60%, preferably at least 70% and more preferably at least 80% of starch by weight of dry matter.

In the present method malt may suitably be used as a source of malt enzymes. However, the present invention also encompasses the use of commercial enzyme preparations containing starch degrading enzymes such as those found in malt, notably α-amylase, β-amylase and/or glucoamylase. Furthermore, it is within the scope of the present invention to employ both malt and commercial enzyme preparation, e.g. malt in the preparation of the aqueous malt enzyme suspension and commercial enzymes in the preparation of the decoctions suspension. Preferably, the malt enzymes are employed in the present method in the form of malt. In accordance with a particularly preferred embodiment of the invention, part of the aqueous malt enzyme suspension prepared in step a. is employed as the second enzyme source in step b. Even more preferably, 1-50 wt. % of the aqueous malt enzyme suspension prepared in step a. is employed as the second enzyme source in step b. and the remainder of the aqueous malt enzyme suspension is combined with the heated decoction suspension obtained from the second heat treatment.

The present invention encompasses a method in which the aqueous malt enzyme suspension is separated in two malt enzyme suspensions that have different solids contents, e.g. a thick and a thin mash suspension. Preferably, however, the composition of the aqueous malt enzyme suspension of step a. and the second enzyme source of step b. is identical. Typically, the solids content of the malt enzyme suspensions employed in the present process is within the range of 200-500 g/l, preferably within the range of 250-350 g/l.

The benefits of the present method are most pronounced when a substantial fraction of the fermentable sugars in the mash extract are provided by the one or more adjuncts. Accordingly, in a preferred embodiment at least 5 wt. %, preferably from at least 10 wt. % and more preferably 20-90 wt. % of the fermentable sugars contained in the mash extract originate from the one or more starch-containing adjuncts.

Typically, the first heat treatment in the present method advantageously involves heating the decoction suspension to within a temperature range of 60-85° C., preferably to within a temperature range of 65-82° C. and more preferably to within a temperature range of 65-80° C. The duration of the first heat treatment preferably is within the range of 1-30 minutes, more preferably within the range of 2-15 minutes.

Individual starch granules are known to gelatinise over a temperature interval. As temperature increases more starch granules gelatinise. With further increasing temperature the starch granules begin to break down and at peak viscosity the rate of break down starts to exceed gelatinisation and resulting viscosity begins to drop off. In the present method, the decoction suspension reaches its peak viscosity during the second heat treatment. Typically, the viscosity of the decoction suspension after the second heat treatment does not exceed 30 Pa·s. Preferably, said viscosity does not exceed 10 Pa·s and more preferably, said viscosity does not exceed 1 Pa·s. These viscosities are determined in the same way as described herein before.

The second heat treatment of the decoction suspension advantageously involves heating to within a temperature range of 85-120° C., more preferably to within a temperature range of 100-120° C. The duration of the second heat treatment preferably is within the range of 1-30 minutes, more preferably within the range of 2-15 minutes.

Other Features

In accordance with a particularly preferred embodiment, all the steps up to and including the removal of yeast from the fermentate are executed in a continuous fashion. Most preferably, all the processing steps of the present method, including the mashing are operated in a continuous fashion.

The present invention enables flawless uninterrupted operation of a fully continuous brewing process for periods of several weeks or even several months, thus delivering the full range of benefits that are associated with continuous brewing. Accordingly, in a particular advantageous embodiment of the present method all the steps of the present method that are executed in a continuous fashion are operated uninterruptedly for at least 2 weeks, more preferably for at least 3 weeks, even more preferably for at least 4 weeks and most preferably for at least 25 weeks.

It is noted that in accordance with a particular embodiment of the process that is illustrated in the examples, all the steps of the present method up to and including the removal of yeast from the fermentate are conducted in a continuous fashion, whereas cold storage and filtration are carried out batch-wise. By selecting a filtration unit with adequate filtration capacity, the total volume of fermentate produced in 24 hours may be filtered in e.g. 10-23 hours. Thus, every day there is sufficient time for cleaning the filter before the next batch of fermentate is filtered.

It has been demonstrated that the present method is suitable for large scale production of bright beer. Thus, the present method may suitably be used to replace brewing methods that are currently operated in commercial breweries. In the present method the essentially low-yeast fermentate is suitably clarified at a flow rate of at least 10 hl/hr, preferably at least 40 hl/hr, more preferably of at least 100 hl/hr, even more preferably of at least 150 hl/hr. As a matter of fact flow rates of at least 200 hl/hr or even at least 500 hl/hr are feasible. Likewise, the present method may suitably be used to clarify at least 2000 hl, preferably at least 4000 hl of low-yeast fermentate in a single run.

The clarification efficiency of the present method may be further enhanced by adding glucanase to the mash or wort. Glucanases, especially (1,3-1,4)-β-glucanases are used in the manufacture of different food products and animal feed and as subsidiary materials in biological research when it is necessary to cleave the β-glycosidic linkages in (1,3-1,4)-β-glucans. The addition of such glucan hydrolysing enzymes to the mash or wort serves the purpose of counteracting the viscosity enhancing effect of glucan compounds. Generally speaking, filtration efficiency is conversely correlated with the viscosity of the fluid that is being filtered.

The invention is further illustrated by means of the following examples:

EXAMPLES

Example 1

A stream of 1 m³/hr of wort is produced with an extract concentration of 15° P at the end of the wort production process. This wort is fermented, matured and stabilised in batch fermenters and subsequently continuously centrifuged and filtered.

At the front of the process, 400 l/hr of brewing water (50° C.) is continuously mixed with 200 kg/hr hammer milled malt grist (screen size 1.5 mm). Both streams are fed into a continuous stirred tank reactor of 70 liter working volume at a temperature of 50° C. The residence time of this treatment is about 7 min and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231 At certain heights in the column, the mash is heated by heating jackets and the total reactor is insulated to minimise heat losses. Temperatures are chosen such that the conversion of malt starch to fermentable sugars is appropriate for the product desired. The temperature profile in this example has a first rest at 50° C. for 8 min followed by a heating time to 67° C. of 11 min. The subsequent saccharification rest at 67° C. has a duration of 37 min and the mash is then heated in 4 min to a mashing-off temperature of 78° C., at which temperature there is a final rest of 4 min. The mash has a total residence time inside the column of 64 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 3500 rpm and a differential screw speed of 2 rpm. This decanter has a SIGMA value of 1700 m$^2$. The SIGMA factor of a decanter is calculated according to the following relation between: the length of the cylindrical bowl (L), the gravitational acceleration (g), the angular speed ($\omega$), the radius of the dam ring or overflow ring ($r_1$) and the radius of the cylindrical bowl ($r_2$).

$$\sum = \frac{\omega^2}{g} \pi L \left( \frac{3}{2} r_2^2 + \frac{1}{2} r_1^2 \right)$$

The product is discharged to the next unit operation (boiling) and the spent grains are released into a small continuous stirred tank reactor. In the latter, 500 l/hr washing water of 80° C. is applied and with a residence time of 5 minutes, spent grains particles and water are homogeneously mixed.

The liquid phase still contains extract and the mixture is therefore again separated by a second decanter operating at a rotational speed of 4000 rpm and a differential screw speed of 3 rpm. This decanter has a SIGMA value of 1800 m$^2$. The clarified liquid supernatant is recirculated and combined with the exit flow from the mashing column. This lowers the extract concentration in the feed of the first decanter to about 17° P. Both decanters were equipped with a centrifugal fan and consequently work as a pump on the supernatant outlet.

The product from the mash separation is now referred to as wort and has a flow rate of 1 m$^3$/hr. Hop extract at a rate of 7 g/hr is dosed continuously in-line and the mixture is heated to a temperature of 103° C. by direct steam injection. By the positive head of the first decanter, the wort is pumped into a plug flow reactor. This column reactor has the same characteristics as the earlier described mashing conversion column, but the height is proportionally increased with the increased flow rate in this part of the process. The residence time within the column reactor is 60 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 20 kg/h and at atmospheric conditions at the top of the stripper. The wort leaving the bottom of the stripper is fed into a small buffer with negligible dimensions and directly fed into a centrifuge of the discontinuously discharge type. This machine has a rotational speed of 7400 rpm and a theoretical capacity factor of 13000 m$^2$. The discharge frequency is regulated by the cake deposit inside the machine.

Next, cooling of the wort takes place in two parallel plate and frame wort coolers that lower the wort temperature from 95-100° C. to 8° C. by a two stage water-glycol set-up.

A total volume of 2.2 m$^3$ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 5 days.

Thereafter, the beer was led over a separator of the discontinuous discharge type with a flow rate of 0.6-1.0 m$^3$/hr and a SIGMA value of 13000 m$^2$. The beer was cooled and stored for another 24 hours at −1.5° C. The beer was then filtered over a kieselguhr bright beer filter of the vertical disc type. The achieved flow rate was 0.8 m$^3$/hr/m$^2$ with an average pressure build-up over time of 0.2 bar/hr. After this filtration, the beer is stabilised with the usual dosings of PVPP (polyvinylpolypyrolidone) and the necessary PVPP filtration. Finally, the beer was packaged in suitable containers (glass bottle).

When the aforementioned experiment was repeated, except that no separator was employed after fermentation. The average pressure build-up across of the filter was found to be of the order of magnitude of 12 bar/hr.

Example 2

A stream of 4.5 m$^3$/hr of wort is produced with an extract concentration of 18° P at the end of the wort production process. This wort is fermented and matured in continuous fermenters and subsequently stabilised in batch storage tanks, separated in a centrifuge and filtered on a bright beer filter.

At the front of the process, 1620 l/hr of brewing water (47° C.) is continuously mixed with 720 kg/hr malt grist. This malt grist was produced by a hammer mill equipped with a 2.5 mm screen. Both streams are fed into a continuous stirred tank reactor of 80 liter working volume at a temperature of 45° C. Part of the mixture is directed to a subsequent plug flow mashing column, similar to the one described in Example 1. The other part (250 l/hr) of the mixture is fed into a parallel process that enables the usage of unmalted maize grits as adjunct for the final beer product.

In this continuous decoction process, unmalted maize grits are fed (350 kg/hr) into a continuous stirred tank reactor together with a stream of brewing water of 52° C. (790 kg/hr) and the abovementioned stream of malt mash. The resulting temperature in this 120 liter vessel on combination of the streams is 50° C. which prevent excessive gelatinisation of the maize starch and the related viscosity increase. The mixture is pumped to a first holding column via a direct steam injection point. Steam is injected to elevate the temperature of the decoction stream to 75-78° C. and part of the maize starch is gelatinised. However, due to the presence of a portion of the malt mash the amylases from the malt break up the polymeric starch strains and lower the viscosity. The residence time of 15 min at the specified temperature enables the viscosity to be reduced to a level where another temperature increase to 100° C. can be applied without causing unacceptably high viscosities. This second step is done by another direct steam injection and a 10 min residence in a simple plug flow reactor. The resulting gelatinised mixture is cooled to 90° C. and subsequently fed into the mashing column whereby the temperature is raised to a level that is optimal for amylase activity and the complete conversion of starch of malt and maize to sugars.

The cylindrical plug flow reactor for the mashing process has been described in earlier patents by Heineken (WO 92/12231). At certain heights in the top of the column, the mash is heated by direct steam injection. Temperatures are chosen such that the conversion of malt starch to fermentable sugars is appropriate for the product desired. Present temperature profile has a saccharification rest at 66° C. and a mashing off temperature of 76° C. The mash has a residence time of 80 minutes and the resulting mash is fed into the mash separation section.

This section consists of two scroll type bowl centrifuges with a continuous discharge of clarified liquid and thickened spent grains, known generally as decanters. The first decanter operates at a rotational speed of 3650 rpm, a differential screw speed of 10 rpm, and a theoretical capacity factor of 6200 $m^2$. The product is discharged to the next unit operation (boiling) and the spent grains are released into a small continuous stirred tank reactor. In the latter, 1150 l/hr washing water of 72° C. is applied and, with a residence time of 2 minutes, a homogeneous suspension of malt particles and water is achieved. The liquid phase still contains valuable extract and the mixture is therefore again separated by a decanter operating at a rotational speed of 4000 rpm, a differential screw speed of 20 rpm, and a theoretical capacity factor of 2600 $m^2$. The clarified liquid supernatant is recirculated and combined with the exit flow from the mashing column. This lowers the extract concentration in the feed of the first decanter to about 17° P. The spent grains from the second decanter are discharged for cattle feed purposes. Both decanters were equipped with a centrifugal fan and consequently work as a pump on the supernatant outlet.

The product from the mash separation is now referred to as wort and has a flow rate of 4.5 $m^3$/hr. Hop extract at a rate of 32 g/hr is dosed in-line and the mixture is heated to a temperature of 105° C. by direct steam injection. By the positive head of the first decanter, the wort is pumped into a plug flow reactor. This column reactor has the same characteristics as the earlier described mashing conversion column, but the height is proportionally increased with the increased flow rate in this part of the process. The volume of this reactor is 5 $m^3$ and the residence time is therefore 67 min. Typical reactions taking place in the reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent to remove undesirable flavour compounds (mainly DMS) at a flow rate of 100 kg/hr and at atmospheric conditions. The wort leaving the bottom of the stripper is fed into a small buffer with negligible dimensions and directly fed into a centrifuge of the discontinuously discharge type. This machine has a rotational speed of 7400 rpm and a SIGMA value of 70000 $m^2$. The discharge frequency is regulated by the cake deposit inside the machine.

Cooling of the wort takes place by two parallel plate and frame wort coolers that lower the wort temperature from 95-100° C. to 4° C. by a two stage water-glycol set-up.

Cooled wort is fed into the first stirred fermentation vessel with a net working volume of 14 $m^3$. The vessel is operated at a temperature of about 10° C. This vessel is operated under aerobic conditions by the continuous addition of an aerated recirculated stream from the end of the process, containing thickened yeast as the main constituent besides water. The gravity in this vessel is 13° P. The yeast necessary for the fermentation is added in the form of the abovementioned recirculated stream.

The fermentation broth from the first fermentation vessel is transferred to the second vessel. This vessel has a working volume of 160 $m^3$ and is kept at a temperature of 13° C. by wall cooling. The apparent extract level in this vessel is 7° P and the yeast concentration is 80 g wet yeast/l. The outlet of this vessel is split into two streams: one part (2.5 $m^3$/hr) is combined with another stream from the end of the process and recirculated to the first fermentation vessel, whereas the other part (5.3 $m^3$/hr) is fed into a third fermentation vessel.

This third vessel has a working volume of 140 $m^3$ and the contents have an apparent extract level of 3.5° P. The product of this vessel is transferred to a yeast sedimentation vessel with a working volume of 7 $m^3$. The yeast sedimentation vessel separates the main part of the yeast (90-95%) from the green beer. The compacted yeast in the bottom of the yeast sedimentation vessel has a yeast concentration of 200 g wet yeast/l. This stream is partly recirculated to the front of the process and partly sent to waste surplus yeast storage. The part of the yeast sent to surplus is controlled on the basis of the amount that is leaving the top of the yeast sedimentation vessel and the amount of yeast grown in the fermentation vessels. Green beer from the top of the yeast sedimentation vessel is continuously fed into either batch maturation tanks or into a continuous maturation vessel.

In case of the batch option, the working volume of the maturation tank is equal to the total volume of fermented wort produced in 24 hours. The temperature is allowed to raise to 15° C. by heat exchange in the pipe towards the maturation tank and/or natural fermentation heat development. This temperature favours conversion of acetolactate (a metabolic fermentation product) to diacetyl. Due to the presence of yeast in this phase, the yeast can take up the diacetyl and convert it to acetoin or subsequent metabolites. The negative impact of diacetyl in the beer is therewith removed and residual diacetyl levels are typically determined to be <20 ppb. After the diacetyl reduction has reached acceptable levels, the beer is cooled down to −1.5° C. and stored for several days. After this period, the beer is filtered over kieselguhr with 80-100 g/hl kieselguhr as bodyfeed. Prior to filtration, the beer is centrifuged with a disc type separator that operates at 70000 $m^2$ theoretical capacity factor to remove total suspended solids with an efficiency of 95-98%. Typical filtration runs are performed on 6000-8000 hl at a flow rate of 4-5.5 hl/$m^2$/hr. After this filtration, the beer is stabilised with the usual dosings of PVPP and the necessary PVPP filtration. Finally, the beer is packaged in any suitable container (bottle, keg, can).

When using a continuous maturation process, the green beer is continuously fed in the top of a 520 $m^3$ vessel via a spray ball that distributes the beer over the surface area of the tank. In this example, the beer was heated from 13° C. to 15°

C. with a shell and tube heat exchanger. This will accelerate the abovementioned conversion of α-acetolactate formed during primary fermentation towards diacetyl. The yeast will settle through the beer and will establish the abovementioned conversion of diacetyl and other vicinal diketones to acetoin and subsequent metabolites. The beer has a residence time in this example of 100 hours and the residual diacetyl levels are 7.3±2.3 ppb (95% CI, n=6). The yeast settles at the conical bottom of the maturation tank and is removed and treated as rest beer. The matured beer is removed from just above the settled yeast cone and is transferred via a continuous heat exchanger towards batch cold storage tanks at a temperature of −1.5° C.

Cold storage tanks are filled in one day and thereafter, the beer is stored for at least 2 days at a temperature of −1.5° C. After this storage period, sedimented yeast is purged from the bottom of the tank and the remaining beer is separated over a disc type centrifuge as described above. Directly after this treatment, the beer is filtered over a kieselguhr filter at a typical flow rate of at a flow rate of 4-5.5 hl/m$^2$/hr with a filtration run of on 6000-8000 hl.

After the beer has been stabilised by PVPP treatment, it is packaged in the desired packaging materials (bottle, can, keg).

The invention claimed is:

1. A method of producing a bright, yeast fermented beverage, the method comprising:
   a. mashing a particulate, starch-containing and optionally malted raw material with water,
   b. heating the resulting mash and enzymatically hydrolysing the starch to fermentable sugars;
   c. continuously producing a fermentable wort from the heated mash by executing the following steps in a continuous fashion:
      (i) removing spent grain from the heated mash to produce a mash extract;
      (ii) converting mash extract into wort by heating said mash extract to a temperature of 60-140° C. for 5-120 minutes;
      (iii) removing organic volatiles from the wort by reducing pressure and/or by stripping the wort with a gas or steam;
      (iv) removing trub from the wort by centrifugation in a centrifuge that is operated at a centrifugal force of a theoretical capacity factor ($\Sigma$) of at least 1,000 m$^2$ at a flow rate of 1 m$^3$/hr; and
   d. introducing the wort into a fermenter to ferment the wort in the presence of biologically active self-aggregated yeast cells;
   e. transferring the fermentate from the fermenter to a sedimentor to produce a low-yeast fermentate having a yeast content of not more than 20 g/1 by removing yeast from the fermentate by means of sedimentation; and
   f. clarifying the low-yeast fermentate at a throughput of more than 4 hl/hr/m$^2$ with a pressure increase of not more than 0.3 bar/hr to produce the bright, yeast fermented beverage by:
      (i) processing the low-yeast fermentate in one or more separators prior to filtration to remove suspended material, wherein the separators are selected from the group consisting of centrifuges and decanter centrifuges, and wherein the processing is conducted at a theoretical capacity factor (SIGMA value) of at least 1,000 m$^2$ at a flow rate of 1 m$^3$/hr; and
      (ii) filtering the processed fermentate;
   wherein at least a part of the yeast that is removed from the fermentate by means of sedimentation is recirculated to the fermenter, and wherein the low-yeast fermentate is maintained at a temperature of less than 10° C. for at least 12 hours before the processing in the one or more separators.

2. The method according to claim 1, wherein the biologically active yeast employed in steps (d) and (e) is immobilised by self-aggregation.

3. The method according to claim 1, wherein between 10 and 100% of the yeast sediment that is removed from the sedimentation vessel is recirculated to the wort fermentation.

4. The method according to claim 1, wherein the wort is fermented in a continuous fashion by:
   (i) feeding the wort into a propagation vessel in which oxygen is supplied to initiate yeast growth; and
   (ii) transferring the wort from the propagation vessel into a sequence of one or more fermentation vessels in which the yeast is kept suspended by means of stirring, recirculation and/or carbon dioxide evolution.

5. The method according to claim 1, wherein at least 80 wt. % of the yeast present in the fermentate is removed by sedimentation.

6. The method according to claim 5, wherein at least 90 wt. % of the yeast present in the fermentate is removed by sedimentation.

7. The method according to claim 1, wherein the trub is removed in a centrifuge that is operated at a centrifugal force of at least a theoretical capacity factor ($\Sigma$) of at least 2,500 m$^2$ at a flow rate of 1 m$^3$/hr.

8. The method according to claim 7, wherein the trub is removed in a centrifuge that is operated at a centrifugal force of at least a theoretical capacity factor ($\Sigma$) of at least 5,000 m$^2$ at a flow rate of 1 m$^3$/hr.

9. The method according to claim 8, wherein the trub is removed in a centrifuge that is operated at a centrifugal force of at least a theoretical capacity factor ($\Sigma$) of at least 10,000 m$^2$ at a flow rate of 1 m$^3$/hr.

10. The method according to claim 1, wherein the low-yeast fermentate is processed in one or more centrifuges prior to filtration at a SIGMA value of at least 2,500 m$^2$ at a flow rate of 1 m$^3$/hr.

11. The method according to claim 10, wherein the low-yeast fermentate is processed in one or more centrifuges prior to filtration at a SIGMA value of at least 5,000 m$^2$, at a flow rate of 1 m$^3$/hr.

12. The method according to claim 1, wherein the clarification of the low-yeast fermentate comprises cake filtration or cross-flow membrane filtration.

13. The method according to claim 1, wherein the low-yeast fermentate is clarified at a throughput of more than 4 hl/hr/m$^2$ with a pressure increase of not more than 0.2 bar/h.

14. The method according to claim 1, wherein the wort is fermented in a continuous fashion by:
   (i) feeding the wort into a propagation vessel and combining the wort with a recirculated stream of feimented yeast-containing wort and in which oxygen is supplied to initiate yeast growth; and
   (ii) transferring the wort from the propagation vessel into a sequence of one or more fermentation vessels in which the yeast is kept suspended by means of stirring, recirculation and/or carbon dioxide evolution;
   (iii) feeding the fermented wort into one or more sedimentors to remove a yeast-containing residue;
   (iv) recirculating at least a part of the yeast-containing residue to the propagation vessel and/or the one or more fermentation vessels; and
   (v) converting the remainder of the fermented wort into the bright, yeast fermented beverage.

15. The method according to claim 1, wherein steps (c) to (d) are executed in a continuous fashion.

16. The method according to claim 1, wherein steps (a) to (e) are executed in a continuous fashion.

17. The method according to claim 15, wherein all the steps that are executed in a continuous fashion are operated uninterruptedly for at least 2 weeks.

18. The method according to claim 17, wherein all the steps that are executed in a continuous fashion are operated uninterruptedly for at least 4 weeks.

19. The method according to claim 1, wherein the spent grain is removed from the heated mash by means of one or more separators selected from the group consisting of centrifuges and decanters.

20. The method according to claim 1, wherein glucanase is added to the mash or wort.

21. The method according to claim 1, wherein the low-yeast fermentate is clarified at a flow rate of at least 40 hl/hr.

* * * * *